M. Prillaman,
Plow Draft Regulator.
No. 97,690. Patented Dec. 7, 1869.
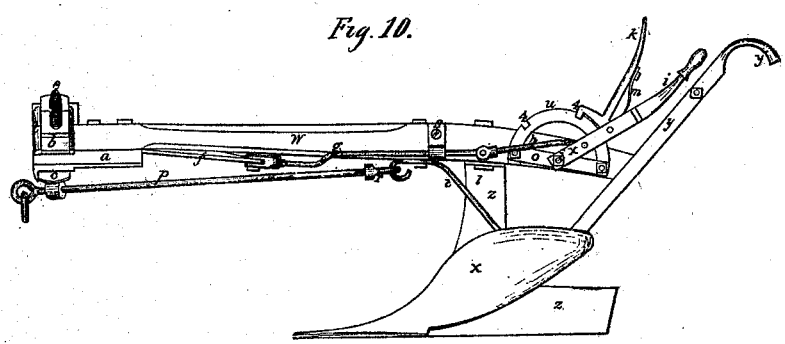
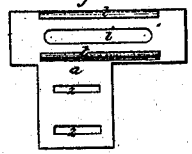
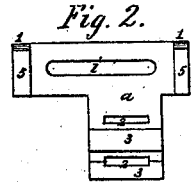
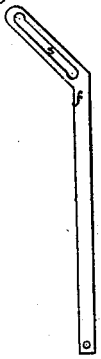
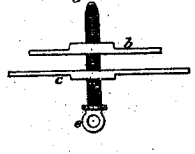
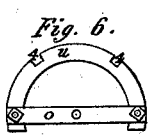
Witnesses.
Adam Jackson.
Wm Stivers
Inventor.
Martin Prillaman

UNITED STATES PATENT OFFICE.

MARTIN PRILLAMAN, OF TIPTON, INDIANA, ASSIGNOR TO HIMSELF AND ELIZABETH RESSLER, OF SAME PLACE.

IMPROVEMENT IN DRAFT-REGULATORS FOR PLOWS.

Specification forming part of Letters Patent No. 97,690, dated December 7, 1869.

*To all whom it may concern:*

Be it known that I, MARTIN PRILLAMAN, of Tipton, in the county of Tipton and State of Indiana, have invented certain new and useful Improvements in Draft-Regulators for Plows, by which any breaking-plow may be changed to subsoil with to any required depth, and when changed to subsoil with the draft is just right for three horses abreast, and the draft may be changed at any time desired, which I have described in the following specification and illustrated in the accompanying drawings with sufficient clearness to enable others of competent skill to make and use my invention.

My invention consists in the arrangements and combination of parts hereinafter described, by which I change the draft from parallel with the beam to the land side of the plow, which gives the plow the right draft to run in the same furrow and subsoil. The draft in either side may be further regulated by moving guide-plate on the end of the beam.

My "draft-regulator" may be attached to any breaking-plow of ordinary construction, as shown at Figure 10 of the accompanying drawings, and I construct my draft-regulator by making plate $a$ as represented at Figs. 1, 2, 9, and 10, Figs. 1, 2, and 10 being horizontal sections. Fig. 1 represents the top of the plate $a$ with a slot, $i\ i$, in the center of that part of the plate that extends at right angles with the beam of the plow, the slot $i\ i$ being the net width for screw $e$ to pass through, and slide from one end to the other of slot $i\ i$, and on either side of slot $i\ i$ are raised projections $t\ t\ t\ t$, between which plate $b$ slides. There are also two slots in that part of the plate $a$ that is placed under the beam. These slots are marked 2 2, and are to pass the screws through that fasten plate $a$ to the beam $w$, and they may be loosened at any time for the proper adjustment of plate $a$ from right to left of beam $w$. Fig. 2 shows the bottom or under side of plate $a$, and at each end of it are raised projection, (marked 5 5,) and are raised sufficiently for the slotted end of lever-bar $f$ to slide between plate $a$ and plate $c$. Lips 1 1 are to prevent plate $c$ from turning. There are two raised portions of the plate 3 3 to give strength to the plate $a$, and dotted lines indicate a hole through which lever-bar $f$ passes, as shown at Fig. 9, and the hole marked $j$, which is seen under the beam $w$. Lever-bar $f$ connects by a joint with rod $g$, which passes through plate $s$, and is again jointed to rod $h$, which is connected by bolt to lever $i$, as seen at Fig. 10. Plate $s$ is to steady rod $g$, and is fastened to beam $w$, as seen at Fig. 10. Fig. 6 shows half-circle $u$, with plate $o$, which is firmly fastened to beam $w$ near the handles of the plow, as seen at Fig. 10, lever $i$ being pronged, as seen at Fig. 7. One prong passes on each side of half-circle $u$ and reaches plate $o$, and is there pivoted by screw $i\ x$. Catch $k$, as seen at Figs. 8 and 10, is pivoted in lever $i$, and spring $m$ being firmly fastened near the upper end of catch $k$, and the other end operating against lever $i$. The lower end of catch $k$ is forced into notches 4 4 in half-circle $u$, swivel $r$ being hooked on stay-rod $t$. Draft-rod $p$ is then passed through screw $e$, and is then screwed into swivel $r$, and the plow is ready for use.

The plow consists of an ordinary beam, $w$, sheath $z\ l$, mold-board $x$, landside $z$, and handles $g\ y$.

Deeming the description sufficiently concise, the nature of its operation is as follows: I take hold of handles $y\ y$, catch $m$ being down into the notch 4 farthest from handles $y\ y$. I then plow a first furrow, and then for subsoiling the same furrow I draw catch $k$ back against lever $i$ until catch $k$ is raised out of notch 4. I then draw lever $i$ until catch $k$ catches in the other notch 4 nearest the handles $y\ y$. The draft is then changed, so that the plow runs in the furrow just plowed, and the draft is just right for three horses; and, by unscrewing draft-rod $p$ and turn-screw $e$, either right or left, raises or lowers the draft-rod $p$, as may be desired, to run deep or shallow. The lever $i$, when drawn back nearest the handles, moves draft-rod $p$ to the land side of beam $w$, and, pressing it forward until catch $k$ catches in the farthest notch 4 from the handles, moves the draft-rod $p$ parallel with beam $w$. The moving of draft-rod $p$ is effected by slot $s\ s$, in lever-bar $f$, screw $e$ passing up through plate $c$, which is placed on the under side of plate $a$. The screw is then passed through plate $a$. Then screw $e$ is passed through slot $s\ s$ in lever-bar $f$, and then screwed into plate $b$. The moving of lever-bar $f$ presses against screw $e$ between plate c and plate a. The screw is forced back and forth in slot i i in plate a and slot s s in plate or lever-bar f.

In order to elevate draft-rod p for ordinary subsoiling, I slant the under side of beam w, so that plate a is elevated on the land side as may be desired for the use intended. Slot s s in lever-bar f is curved at each end, as seen at Fig. 3 of the drawings, for the purpose of affording a more certain lock, and holding screw e when moved to either end by the motion of lever i.

I do not claim the plow composed of beam w, sheath z l, mold-board x, landside z, and handles y y, as it is an old and well-known device; but What I do claim, and desire to secure by Letters Patent, is—

Plate a, plates b and c, screw e, and lever-bar f, in combination with half-circle u, plate o, lever i, catch k, spring m, and draft-rod p, substantially as herein set forth, and for the purposes specified.

MARTIN PRILLAMAN.

Witnesses:
S. H. YOCUM,
W. B. NEAL.